US005226199A

United States Patent [19]
Jacoby

[11] Patent Number: 5,226,199
[45] Date of Patent: * Jul. 13, 1993

[54] INTERMITTENT WIPER CLEANING SYSTEM

[76] Inventor: John J. Jacoby, 1919 Paper Mill Rd., Huntingdon Valley, Pa. 19006

[*] Notice: The portion of the term of this patent subsequent to Jun. 19, 2007 has been disclaimed.

[21] Appl. No.: 851,675

[22] Filed: Mar. 12, 1992

Related U.S. Application Data

[63] Continuation-in-part of PCT/US90/04941, Aug. 30, 1990, which is a continuation-in-part of Ser. No. 484,763, Feb. 26, 1990, Pat. No. 5,007,130, which is a continuation-in-part of Ser. No. 406,309, Sep. 12, 1989, Pat. No. 4,934,013.

[51] Int. Cl.⁵ .................. A47L 25/00; B60J 1/20; B60S 1/62
[52] U.S. Cl. .................. 15/250.001; 15/250.19; 15/246; 296/96.15; 401/132
[58] Field of Search ............ 15/250.001, 250.19, 15/246, 256.5, 250.17, 250.16, 236.01, 236.08, 104.92, 104.93; 401/132

[56] References Cited

U.S. PATENT DOCUMENTS

| Re. 32,218 | 7/1986 | Kunert | 296/96.15 |
|---|---|---|---|
| 1,017,081 | 2/1912 | Collins | 15/236.08 |
| 2,310,945 | 2/1943 | Eisenberg | 15/236.08 |
| 2,974,340 | 3/1961 | Kopczynski | 15/250.001 |
| 2,996,850 | 8/1961 | Hoffman | 15/104.92 |
| 3,124,811 | 8/1964 | Treacy | 4/583 |
| 3,196,478 | 7/1965 | Baymiller et al. | 401/132 |
| 3,315,387 | 4/1967 | Heuser | 40/595 |
| 3,334,790 | 8/1967 | Eaton | 401/132 |
| 3,472,675 | 10/1969 | Gordon et al. | 401/132 |
| 3,546,825 | 12/1970 | Dale | 15/250.001 |
| 3,613,318 | 10/1971 | Gianatasio | 15/250.001 |
| 3,768,916 | 10/1973 | Avery | 401/132 |
| 3,826,518 | 7/1974 | Henning | 15/237 |
| 3,908,222 | 9/1975 | Scott | 15/250.001 |
| 3,999,224 | 12/1976 | Kollsman | 4/583 |
| 4,378,484 | 3/1983 | Kunert | 296/96.15 |
| 4,616,376 | 10/1986 | Paretskoi | 15/250.001 |
| 4,685,168 | 8/1987 | Mastromoro | 15/250.001 |
| 4,878,775 | 11/1989 | Norbury | 15/104.93 |
| 4,934,013 | 6/1990 | Jacoby | 15/250.001 |
| 5,007,130 | 4/1991 | Jacoby | 15/250.001 |

FOREIGN PATENT DOCUMENTS

| 1911991 | 10/1970 | Fed. Rep. of Germany. |
| 638443 | 9/1983 | Switzerland. |
| 1512327 | 6/1978 | United Kingdom. |

Primary Examiner—Harvey C. Hornsby
Assistant Examiner—Gary K. Graham
Attorney, Agent, or Firm—Jones, Tullar & Cooper

[57] ABSTRACT

An intermittent wiper cleaning system for removing debris from the surface of a wiper of a windshield or the like formed as a clearing field including at least two rows of projections or depressions formed either in a base member or in the windshield. According to one embodiment, the projections and depressions are provided with full radius rounded ends. According to another embodiment the projections and/or the base member embody micro encapsulated concentrate to better clean the wiper and windshield. In any case the spacing is such that the projections or depressions of one row are arranged to be parallel to the projections or depressions of an adjacent row.

12 Claims, 4 Drawing Sheets

FIG. 8
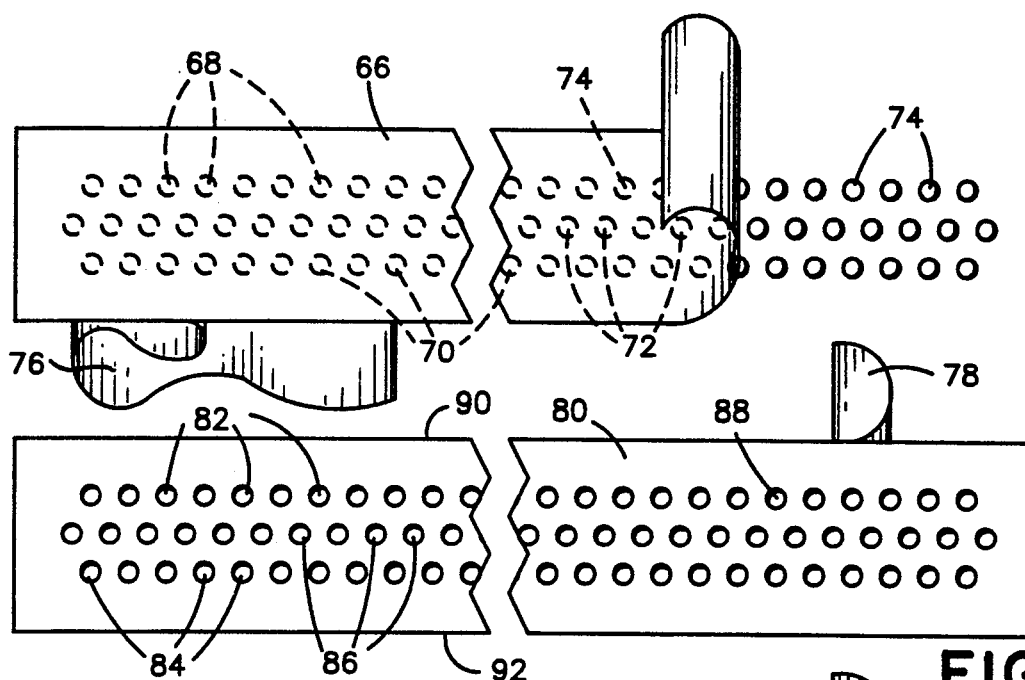
FIG. 9
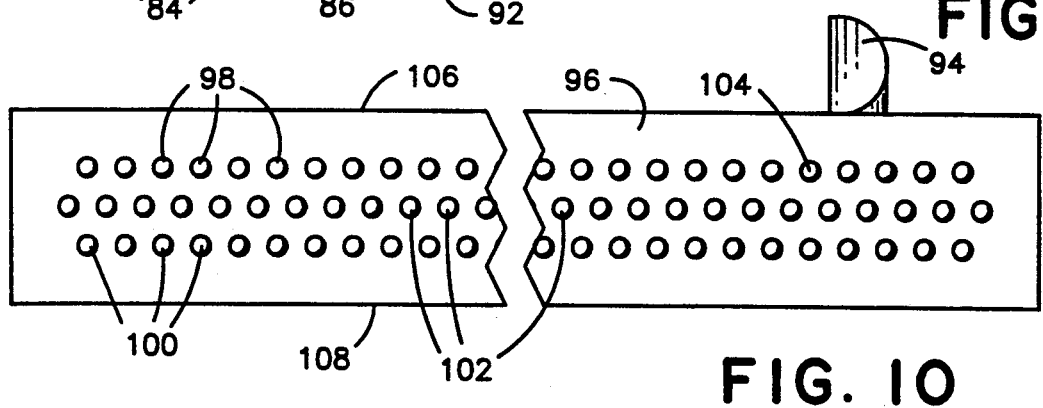
FIG. 10
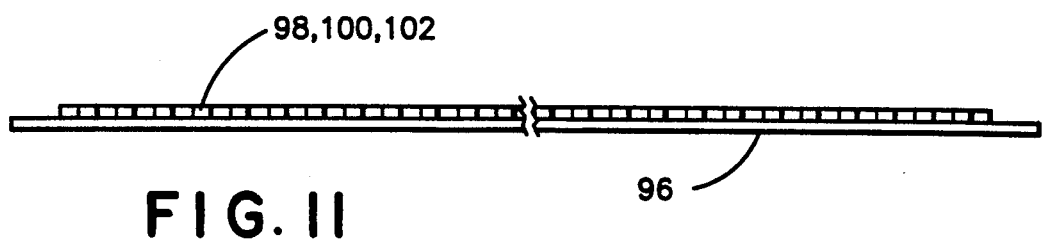
FIG. 11

INTERMITTENT WIPER CLEANING SYSTEM

CROSS REFERENCE TO RELATED APPLICATIONS

This application is a continuation-in-part of International Application No. PCT/US90/04941, filed Aug. 30, 1990, which is a continuation-in-part of application, Ser. No. 484,763, filed Feb. 26, 1990, now U.S. Pat. No. 5,007,130, which is a continuation-in-part of application, Ser. No. 406,309, filed Sep. 12, 1989, now U.S. Pat. No. 4,934,013.

BACKGROUND OF THE INVENTION

1. Technical Field

This invention relates to the improvement of the performance of wipers on windshields and other such surfaces.

2. Prior Art

Maintaining good visibility is essential for safety when operating a vehicle such as a motor vehicle, in an inclement environment, (rain, snow and the like). The prior art is replete with unrewarded efforts to clean or restore wipers on windshields to improve visibility without creating other problems.

For example, German Pat. 1911911 issued to Neubauer abrades to restore wiper blades by teaching and showing rough surfaces and saw-tooth like profile lips for the retention of grinding media.

U.S. Pat. Nos. 2,974,340 and 4,685,168 issued to Kopezynski and Mastromoro, respectively share in common a thick rectangular strip, to which construction Kopezynski applied a single row of parallel ribs, while Mastromoro's strip remained blank. Another U.S. Pat. No. 3,908,222 issued to Scott comprises a single row of individual, points oriented diamond shapes.

In addition, in the presence of moisture, the natural environment for wipers, undue wear to the wipers is accelerated by points that pick (tear) and roughness that abrades (cuts).

Until now, those skilled in the art considered the problem solved by the present invention as insoluble. Perserverance has led to the systems of U.S. Pat. Nos. 4,934,013 and 5,007,130, as well as the improvement represented by the present invention, all of which solve a long felt, long existing, but unsolved need.

SUMMARY OF THE INVENTION

The Wiper clearing fields system illustrated and described herein comprises a plurality of discrete raised or recessed, circular or elongated elements in two or more offsetting parallel rows forming a brush like barricade in the path of the wiper to remove exuding rubber from the wiper and other foreign matter including ice and snow to improve the performance of the wiper.

The wiper clearing fields of the present invention are constructed thin (approximately 127 microns or 0.12700 mm), have smooth surfaces and are either circular or have full radius rounded ends for each discrete element arranged in two or more offsetting rows to service the entire wiper and is presented with effective yet inexpensive variations to meet varying needs.

The elements are either manufactured into the surface to be wiped during its construction as illustrated in the embodiment of FIGS. 2 and 3, or are adhesively or otherwise bonded to the surface by means illustrated in subsequent FIGS. 4 through 11 inclusive. The elements of each row are at least partly aligned with the spaces between the elements of the adjacent row to provide complete coverage of the entire length of the wiper.

According to a variant of the invention, it is further contemplated that the elements embody micro encapsulated concentrate to better clean the wipers and windshields.

The product of the present invention in its various configurations has a full menu of objectives the most important of which is the safety of occupants of a vehicle which is enhanced by maximizing visibility of wiper swept windshields. This is accomplished by cleaning to improve the performance of the wipers whenever the wipers are used to prevent streaking and smearing caused by rubber exuding from the wipers as they wear as well as other foreign matter swept from the windshield and attaching to the wipers, including ice and snow. In addition to providing passageways for drainage for removal of matter removed from the windshield and the wipers the discrete elements promote the defrost effort while the clearing field actually improves the memory of the wiper by helping it to reset itself for the return wipe with the other side of the wiper while resisting a permanent set which causes chatter and erratic clearing.

The omni direction clearing fields are virtually noiseless and self cleaning to compliment all rake angles and curvatures and even color gradations of all windshields and will work with all wipers, while the micro encapsulated variation can contain concentrates to down size or miniaturize the spray nozzle, windshield washer reserve tank system.

Constructed basically in this manner, new, unexpected and superior results have been achieved to gain commercial recognition as CLEAN SWEEP TM strips by CLEARTEC TM Corporation to work with all wipers.

Although durable the system is easy to apply and inexpensive while remaining removable indefinitely.

BRIEF DESCRIPTION OF THE DRAWINGS

For purposes of illustration and description only, this invention will be described with reference to windshield wipers, without limiting other uses of the invention.

Illustrated are forms presently preferred; however, it is being understood that this invention is not limited to the precise arrangements and instrumentalities shown.

FIG. 8 illustrates a formatted application strip to transfer the discrete circular raised elements onto an existing windshield.

FIG. 9 illustrates a perspective view of further embodiment of the invention featuring a base member application strip with STRAITEDGE ™ sides and recessed circular elements for application onto an existing windshield.

FIG. 10 illustrates yet another perspective view of further embodiment of the invention featuring a base member application strip with STRAITEDGE ™ sides and raised circular elements for application onto an existing windshield.

FIG. 11 illustrates a longitudinal cross sectional view of FIG. 10 which indicates no straight perpendicular passage between rows of elements for the parallel wiper.

DETAILED DESCRIPTION

Figure 1:
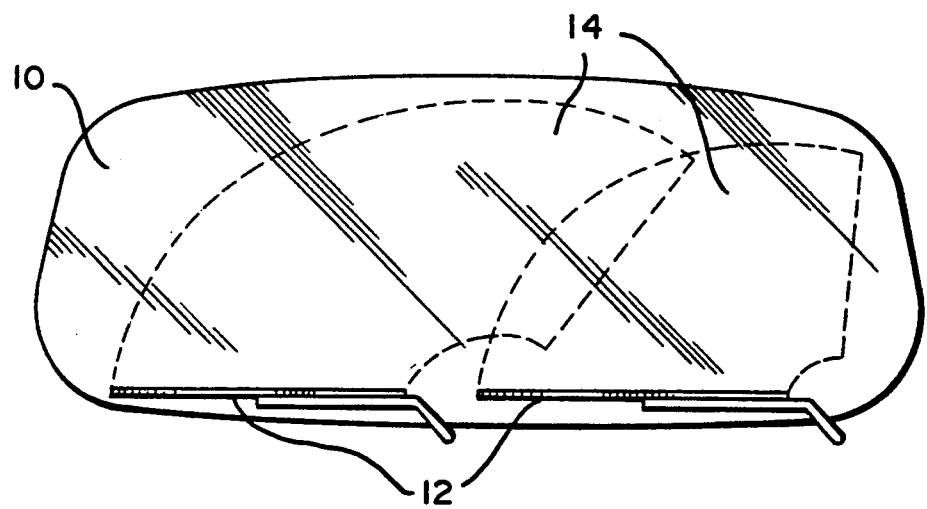
FIG. 1 illustrates a typical windshield with wipers and their typical sweep patterns.

Turning first to FIG. 1, which illustrates a typical vehicle windshield 10 with which the present invention may be used. Associated with the windshield 10 is a pair of windshield wipers 12, which are of the usual rubber type. As used herein, the term "wiper" refers to the wiper blades which contact the windshield, window or other surface which is wiped by the wiper. The wipers 12 are illustrated in FIG. 1 as being in a parked position below the typical arcuate sweep pattern 14 of the wipers when they are operating to wipe the windshield.

Figure 2:
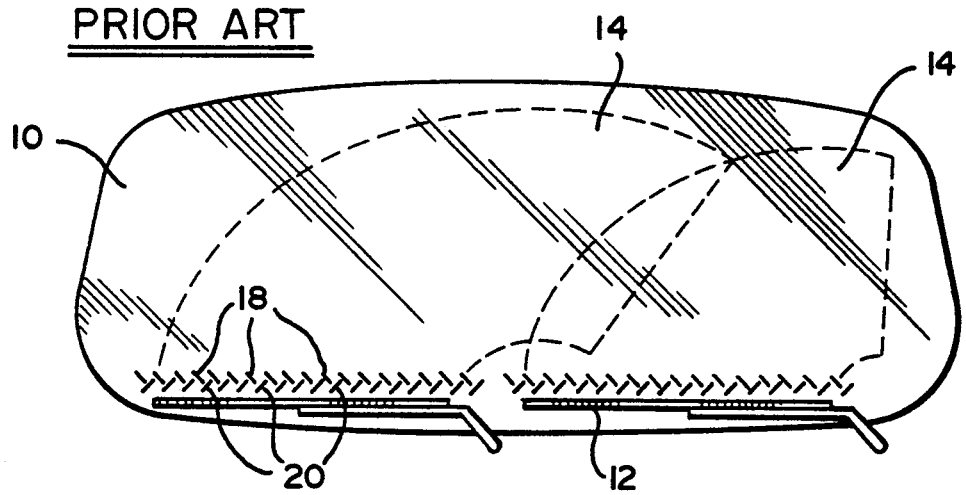
FIG. 2 illustrates one embodiment of the wiper cleaning system featuring elongated elements as it appears when either formed integrally with the windshield or after having been applied onto the windshield in either its raised or recessed variation, directly above the wiper in either its lowest operating or parked position.
Figure 3:
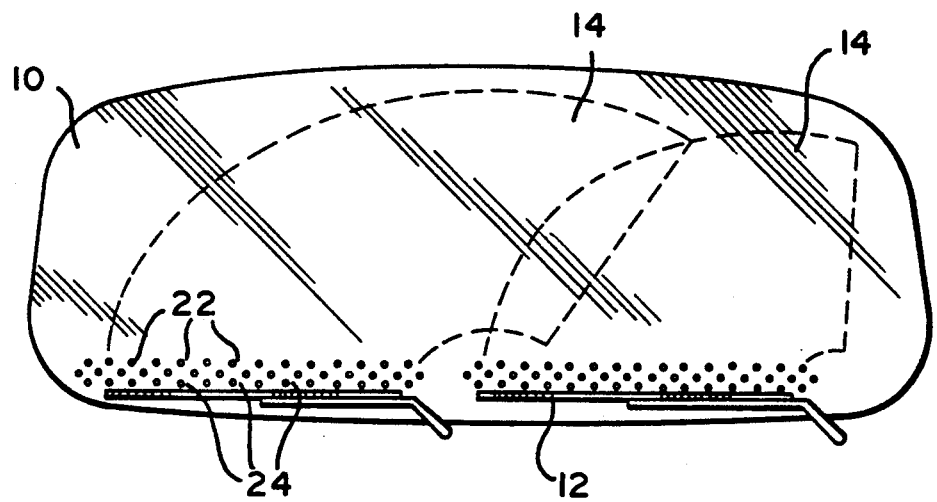
FIG. 3 illustrates another embodiment of the wiper cleaning system featuring circular elements as it appears in the same manner as described in FIG. 2.

The wiper cleaning system of the present invention is illustrated in FIGS. 2-13. FIGS. 2 and 3 illustrate the system made integral with the windshield 10. FIG. 2 illustrates a wiper cleaning system according to the present invention referred to in assembly as a clearing field 16. In FIG. 2 the clearing fields 16 include two rows 18 each with elongated elements 20, wherein respective elongated elements 20 in the rows are generally perpendicular to one another. FIG. 3 illustrates three rows 22 with circular elements 24 in each row, offset one from the other. Either is disposed in the path of the wiper 12 and may be raised or recessed in the manufacturing process.

In the embodiments represented in FIGS. 4-11, the cleaning system is adhesively or otherwise bonded to an existing windshield such as that illustrated in FIG. 1 rather than incorporated into the windshield during its construction.

Figure 4:
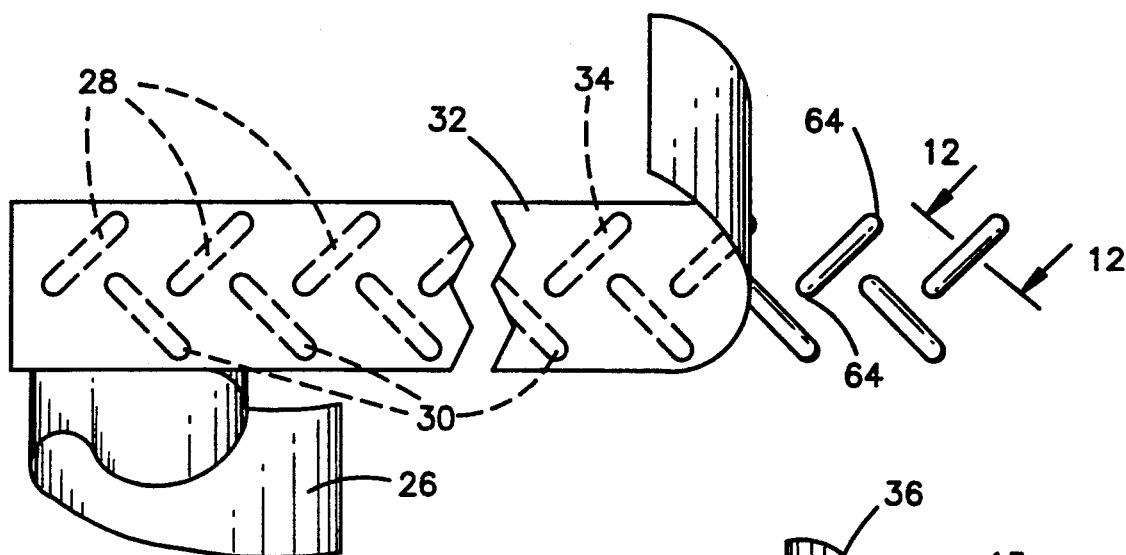
FIG. 4 illustrates a formatted application strip to transfer the discrete elongated raised elements with full redius rounded ends onto an existing windshield.
Figure 5:
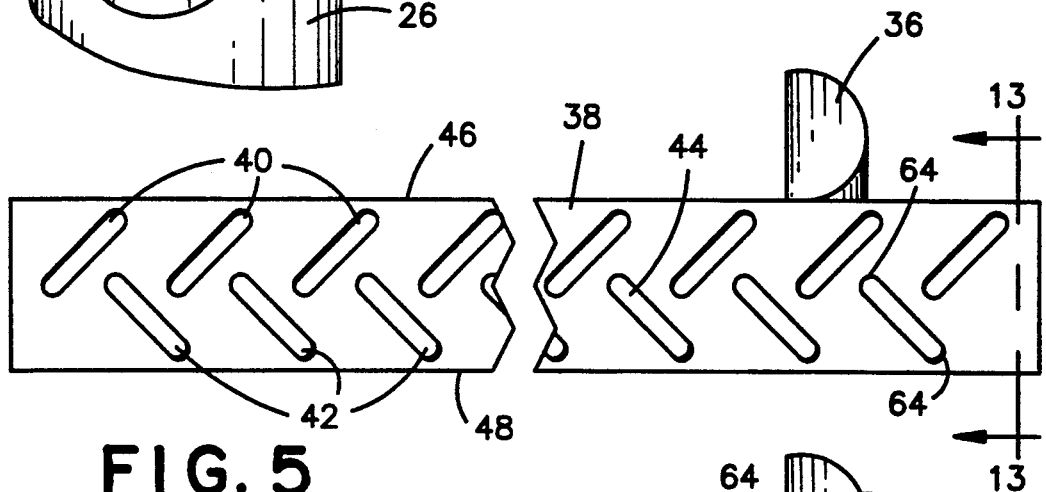
FIG. 5 illustrates a perspective view of further embodiment of the invention featuring a base member application strip with STRAITEDGE TM sides and recessed elongated elements with full redius rounded ends for application onto an existing windshield.
Figure 6:
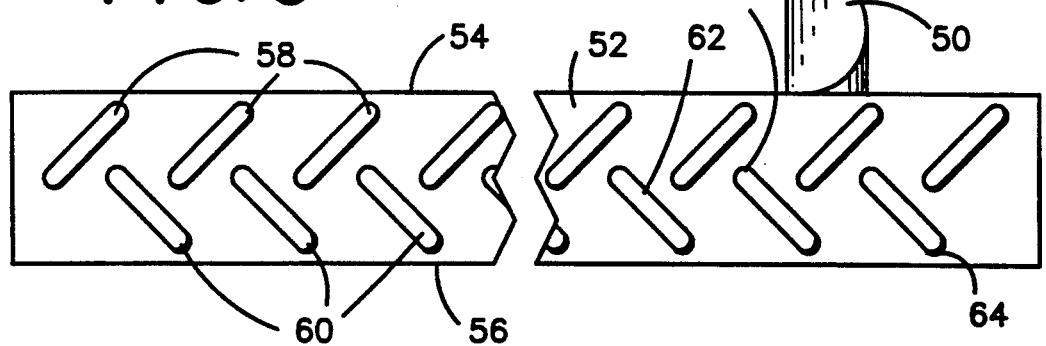
FIG. 6 illustrates yet another perspective view of a further embodiment of the invention featuring a base member application strip with STRAITEDGE ™ sides and raised elongated elements with full radius rounded ends for application onto an existing windshield.
Figure 7:
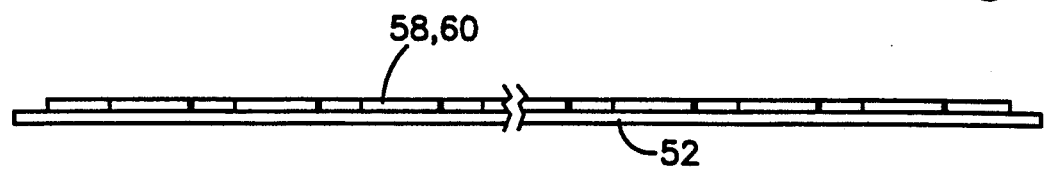
FIG. 7 illustrates a longitudinal cross sectional view of FIG. 8 which indicates no straight perpendicular passage for the parallel wiper between rows of elements.
Figure 12:
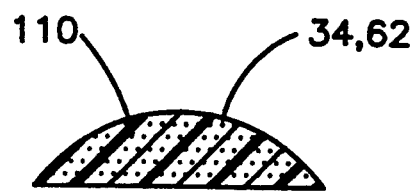
FIG. 12 is a cross-sectional view taken along line 12—12 of FIG. 4.
Figure 13:
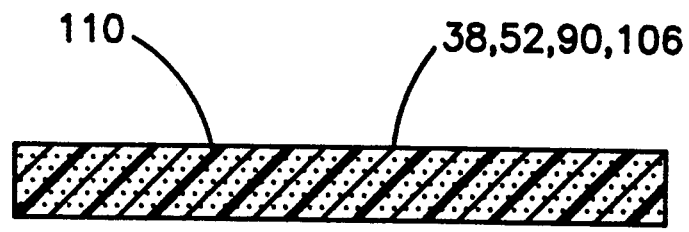
FIG. 13 is a cross-sectional view taken along line 13—13 of FIG. 5.

FIGS. 4-7 and 8-11 are alike except that FIGS. 4-7 illustrate elongated elements with full radius rounded ends while FIGS. 8-11 illustrate circular elements. Each presents three variations; FIGS. 4 and 8 present discrete raised elements, FIGS. 5 and 9 present a base member with recessed elements, FIGS. 6 and 10 present a base member with raised elements and FIGS. 7 and 11 present an elongated cross section of each presentation.

As shown specifically in FIG. 4, a release liner 26 is provided which covers a plurality of rows 28, 30 of spaced scraping elements releasably attached to an application strip 32. The application strip 32 is coated with a release material, such as silicone, to release the rows 28, 30 of the scraping elements from the strip 32 to which they are adhesively, but removably, attached. Each of the rows of scraping elements includes a plurality of elongated scraping elements 34. The opposite surface of the scraping elements 34 are also coated with an adhesive to attach the elements 34 to the windshield 10 or other surface to be wiped.

In use, the release sheet 26 is removed from the assembly of the application strip 26 and the rows 28 and 30 of scraping elements 34, exposing the adhesive coated scraping elements 34. The elongated scraping elements 34 are then applied to the windshield by placing the assembly in the desired position on the windshield or other surface to be cleaned with the exposed adhesive surfaces of the elongated scraping elements 34 in contact with the windshield which should be clean to enhance adhesion.

Once the elongated scraping elements 34 are firmly adhesively attached to the windshield, the application strip 32 may be removed from the scraping elements. This leaves the scraping elements 34 attached to and extending from the surface of the windshield. Thus, the scraping elements 34 are arranged as elongated projections extending from the windshield.

The elongated projections 34 are arranged in at least two rows. Each row comprises, as noted a plurality or series, of generally parallel elongated projections 34, respectively. The projections 34 of one of the rows are spaced and arranged in a manner so that they are oriented generally perpendicular to the projections 34 of the other row. Such an arrangement provides for the effective clearing and cleaning of the wiper while simultaneously allowing for drainage and resisting the accumulation of debris, snow, ice, etc. which may form on the edge of the wiper blade.

Although the elongated scraping elements in the form of projections 34 may be adhesively attached to the windshield as described with respect to FIG. 4, they can, according to the present invention, be integrally formed in the windshield during its manufacture as illustrated in FIGS. 2 and 3. The integrally formed scraping element projections may be of the same elongated shape and in the same alignment and orientation as described above with reference to FIG. 4.

Alternatively, in another preferred embodiment, the elongated scraping elements may be in the form of elongated depressions in a second scraping element assembly, as illustrated in FIG. 5. The assembly illustrated in FIG. 5 comprises a release liner 36 which is adhesively, but removably, attached to a scraper element assembly including a base member application strip 38 in which a plurality of rows 40, 42 elongated depressions are arranged. Each of the rows, two in the embodiment illustrated, includes a series of generally parallel elongated depressions 44. The depressions 44 of one of the rows are spaced and arranged in such a manner that they are generally perpendicular to the depressions 44 of the other row. In this embodiment, the depressions 44 trap and thereby remove the debris from the wiper 12. The perpendicular arrangement of the depressions 4, like the similar arrangement of the projections 34 promotes drainage and resists the accumulation of debris.

In use, the release liner 36 is removed, exposing an adhesive coated on the surface of the base member application strip 38 to be attached to the windshield. The assembly is then carefully positioned in the desired location and attached to the windshield by pressing the strip 38 with its adhesive surface against the windshield, preferably after the windshield has been thoroughly cleaned to promote best bonding.

The strip 38 and scraping depressions 44, once applied to the windshield, also provides two additional scraping edges 46 and 48, corresponding to the top and bottom edges, respectively of the strip 38, as illustrated in FIG. 5. When the wiper travels over the assembly as illustrated in FIG. 5, debris will thereby be scraped and removed from the wiper by the edges of the depressions 44 and the edges 46 and 48 of the strip 38.

As with the scraping elements in the form of elongated projections 34 as discussed above, the elongated depressions 44 could be formed integrally within the windshield 10 during manufacture of the windshield. Alternatively, the depressions 44 could be formed directly in the windshield after manufacture by etching or otherwise removing glass from the outer surface of the windshield by techniques well known to those skilled in the art.

Another preferred embodiment of the present invention is illustrated in FIGS. 6 and 7. The assembly here comprises a release liner 50 releasably covering an adhesive coating applied to one surface of a base member application strip 52. The strip 52 has top and bottom edges 54, 56, respectively, which act as scraping edges for a wiper, when the assembly is attached to a windshield or other surface to be wiped.

Extending from one surface of the strip 52 are a plurality of rows 58, 60 of spaced scraping elements in the form of elongated projections 62 arranged in two rows, respectively. The arrangement and orientation of the elongated projections 62 are preferably substantially the same as set forth above with respect to the projections 34 illustrated in FIG. 4 for substantially the same reason. However, the projections could take other forms and have different spacings so long as there are scraping elements formed in at least two rows, such that the scraping elements of one row are aligned with the spaces between the scraping elements of the adjacent row.

The strip 52 and projections 62 are applied to a windshield by removing release liner 50 to expose the adhesive coating on the one surface of the strip 52. The assembly is then positioned in the desired location on the windshield and the adhesive coating is pressed against the windshield, preferably after the windshield has been thoroughly cleaned to promote best bonding.

In each of the embodiments illustrated in FIGS. 4-7, the projections and depressions are preferably elongated in their configuration. In addition, at least one end, and preferably both ends as shown, of each projection and depression has a full radius rounded end 64. These rounded ends are advantageous and perform better because drainage and cleaning is improved to cause the wipers to last longer, which in turn reduces cost.

In the embodiment illustrated in FIG. 8, an application strip 66 is provided on which a plurality of rows 68, 70, 72 of spaced scraping elements are releasably attached, similar to the embodiment of FIG. 4, except that here the scraping elements take the form of raised, circular projections 74 arranged in two or more rows, and preferably three or more rows. Here too, the strip 66 is coated with a release material, such as silicone, to release the round scraping elements 74. Also, a release liner 76 removably covers the opposite surface of the scraping elements, which surface is also coated with an adhesive to attach the elements 74 to the windshield 10 or other surface to be wiped. The procedure followed to position the elements 74 is the same as that outlined above with respect to the embodiment illustrated in FIG. 4.

The embodiments of FIGS. 9 and 10 are similar in their construction to those of FIGS. 5 and 6 except that the scraping elements are like those of the embodiment of FIG. 8, i.e., circular elements. In FIG. 9, a release liner 78 is adhesively but removably attached to a base member application strip 80. A plurality of rows 82, 84, 86 of circular depressions 88 are arranged, preferably three or more rows, on the strip 80. As in FIG. 5, the strip 80 includes scraping edges 90 and 92. In FIG. 10, a release liner 44 is adhesively but removably attached to a base member application strip 96. A plurality of rows 98, 100, 102 of circular projections 104, preferably three or more, are arranged on the strip 96. And as in FIG. 6, the strip 96 includes scraping edges 106 and 108.

In a preferred embodiment, the elongated elements are approximately 12 mm long, and 1.75 mm wide with full radius rounded ends, spaced approximately 12 mm apart on centers and generally perpendicular one row to another.

In the other preferred embodiment, the circular elements are approximately 3 mm in diameter and spaced 5 mm apart on centers horizontally and vertically one row offset from the other.

The embodiments illustrated in FIGS. 5-7 and 9-11 provide an added advantage to the user, namely, when they are located in the parked position of the wipers, they serve to insulate the wipers from the windshield and prevent fusion and distortion of the wiper blade edges.

Where the clearing fields in any variation for application onto existing windshields or other such surfaces are not impregnable, the preferred material is clear polyester, although other materials are not necessarily ruled out. In liquid form the material can be printed by various methods well known to those skilled in the art, and adhesive can be coated in a known manner also. In solid polyester sheet form a 3M company product known as 7743FL, which features an acrylic, non-yellowing, UV resistant pressure sensitive adhesive with a film liner, is preferred, although not exclusively. Overall thickness of the material including the adhesive is approximately 5 mils. Presently, the preferred method of manufacturing is rotary die cutting with modifications for dedication of presses to produce CLEAN SWEEP TM strips.

Where the clearing fields in any variation for application onto existing windshields or other such surfaces are to micro-encapsulate concentrate such as cleaning detergents generally indicated at 110 (FIGS. 12 and 13) which can include de-icing agents and non-smearing wiper lubricants, it is preferred that the micro-porous structure of the rigid, permeable fluoro silicon acrylate or another polymer or other suitable material, time release slowly when wiper pressure is applied in the presence of moisture, which can be alcohol, to degrade wearably over a period of time, in much the same way that herbicides, fungicides, fertilizers and the like release to break down slowly, say anywhere between 3 months to 3 year.

In those embodiments employing circular projections, the circular projections preferably have a diameter of about 0.5 to 4.5 mm, a thickness of about 0.05 to about 0.50 mm, a center to center generally horizontal spacing of about 3 to 9 mm, and a center to center generally vertical spacing of about 3 to about 7 mm.

What is claimed is:

1. An intermittent wiper cleaning system for removing debris and other foreign matter from a wiper for a surface such as a windshield serviced by a wiper, said system comprising a plurality of discrete raised elements formed as circular projections integral with the surface serviced by the wiper, said elements being arranged in horizontally extending rows that are vertically spaced, said rows extending for a distance corresponding to the length of the wiper, said elements being arranged in parallel horizontal alignment in each row and in generally vertical alignment in alternate rows and in staggered alignment in adjacent rows, said elements being spaced from each other by a distance such that debris and other foreign matter removed from the wiper by the system can be channeled therebetween.

2. The system of claim 1, wherein the raised elements embody micro encapsulated concentrate which responds under pressure from the wiper to clean the wiper and the windshield.

3. An intermittent wiper cleaning system for removing debris and other foreign matter from a wiper for a surface such as a windshield serviced by a wiper, said system comprising a plurality of discrete raised elements projecting from said surface, said elements being formed as circular projections adhesively attached to the surface serviced by said wiper, said elements being arranged in horizontally extending rows that are vertically spaced, said rows extending for a distance corresponding to the length of the wiper, said elements being arranged in parallel horizontal alignment in each row and in generally vertical alignment in alternate rows and in staggered alignment in adjacent rows, said elements being spaced from each other by a distance such that debris and other foreign matter removed from the wiper by the system can be channeled therebetween.

4. The system of claim 3, wherein the raised elements embody micro encapsulated concentrate which responds under pressure from the wiper to clean the wiper and the windshield.

5. An intermittent wiper cleaning system for removing debris from the surface of a wiper of a windshield comprising a generally planar base member having an upper surface, a lower surface, and side surfaces, said lower surface of said base member having adhesive means thereon for attachment to said windshield, said upper surface having a plurality of elongated scraping projections extending therefrom adapted to remove debris from the surface of the wiper, said elongated projections having rounded ends and being arranged in at least two groups, one of said groups having a series of generally parallel elongated projections and the other of said groups also having a series of generally parallel elongated projections, said projections of said one group being spaced from and arranged generally perpendicular to said projections of said other group so as to provide passageways for drainage.

6. The system of claim 5, wherein the upper and side surfaces of the base member define upper and lower scraping edges.

7. The system of claim 6, wherein said projections embody micro encapsulated concentrate which responds under pressure from the wiper to clean the wiper and the windshield.

8. A windshield having a front and back surfaces, said front surface having an upper and lower region, said lower region of said front surface having means for removing debris from the surface of a wiper servicing said windshield, said means including a plurality of elongated scraping projections extending outwardly from said front surface and having rounded ends, said elongated projections being arranged in at least two groups, one of said groups having a series of generally parallel elongated projections and the other of said groups also having a series of generally parallel elongated projections, said projections of said one group being spaced from and arranged generally perpendicular to said projections of said other group so as to provide passage for drainage.

9. The windshield of claim 8, wherein said projections embody micro encapsulated concentrate which responds under pressure from the wiper to clean the wiper and the windshield.

10. An intermittent wiper cleaning system for removing debris from the surface of a wiper of a windshield comprising a generally planar base member having an upper surface, a lower surface, and side surfaces, said lower surface of said base member having adhesive means thereon for attachment to said windshield, and a plurality of elongated scraping depressions formed in said base member and adapted to remove debris from the surface of the wiper, said elongated depressions having rounded ends and being arranged in at least two groups, one of said groups having a series of generally parallel elongated depressions and the other of aid groups also having a series of generally parallel elongated depressions, said depressions of one said one group being spaced from and arranged generally perpendicular to said depressions of said other group so as to provide passageways for drainage.

11. The system of claim 10, wherein the upper and side surfaces of the base member define upper and lower scraping edges.

12. The system of claim 11, wherein the base member embodies micro encapsulated concentrate which responds under pressure from the wiper to clean the wiper and windshield.

* * * * *